H. DAHL & M. MARTIN.
CLOCKWORK FOR SPEED INDICATORS.
APPLICATION FILED DEC. 30, 1907.

1,069,234.

Patented Aug. 5, 1913.

Witnesses.

Inventors.
Hans Dahl
Alan Martin

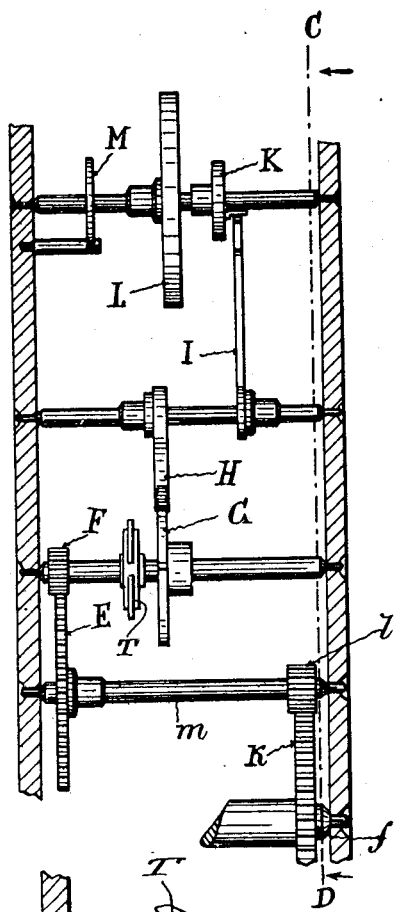
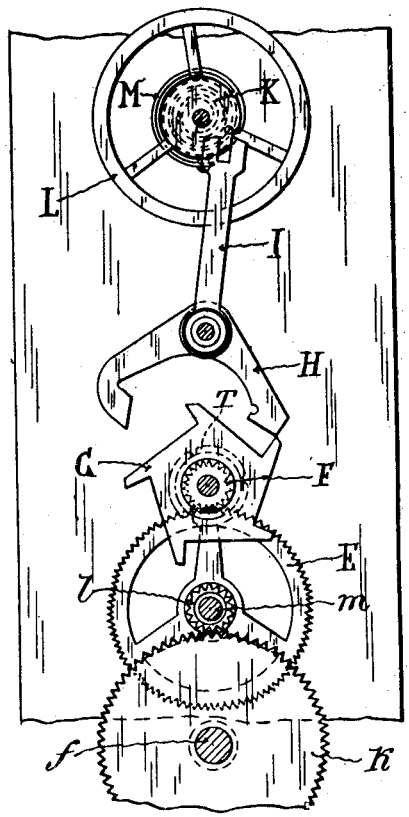
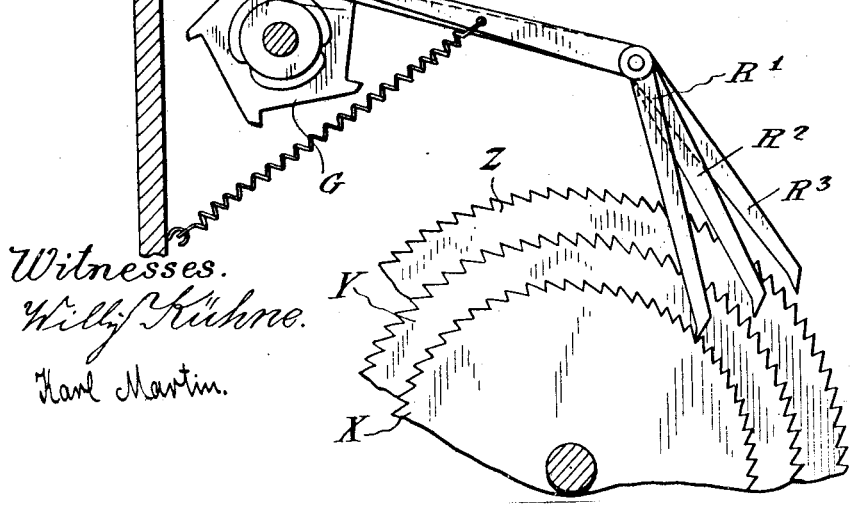

UNITED STATES PATENT OFFICE.

HANS DAHL AND MAX MARTIN, OF BERLIN, GERMANY; SAID MARTIN ASSIGNOR TO SAID DAHL.

CLOCKWORK FOR SPEED-INDICATORS.

1,069,234.  Specification of Letters Patent.  Patented Aug. 5, 1913.

Application filed December 30, 1907. Serial No. 408,684.

*To all whom it may concern:*

Be it known that we, HANS DAHL, a subject of the King of Norway, and MAX MARTIN, a subject of the German Emperor, both residing at Berlin, Prussia, German Empire, have invented certain new and useful Improvements in Clockworks for Speed-Indicators, of which the following is a specification.

Our invention relates to improvements in speed indicators of that class in which clockwork is employed in determining the speed.

In prior apparatuses of this kind the clockwork consists of the usual going-mechanism, including a mainspring, which has to be wound up by a special device. According to our invention, instead of driving the wheel-work by means of a mainspring, we use friction clutch mechanism, one of whose parts is in rigid connection with the said wheel-work. The operation of driving the clockwork is thus rendered considerably simpler and the action is immediate.

Figure 1:
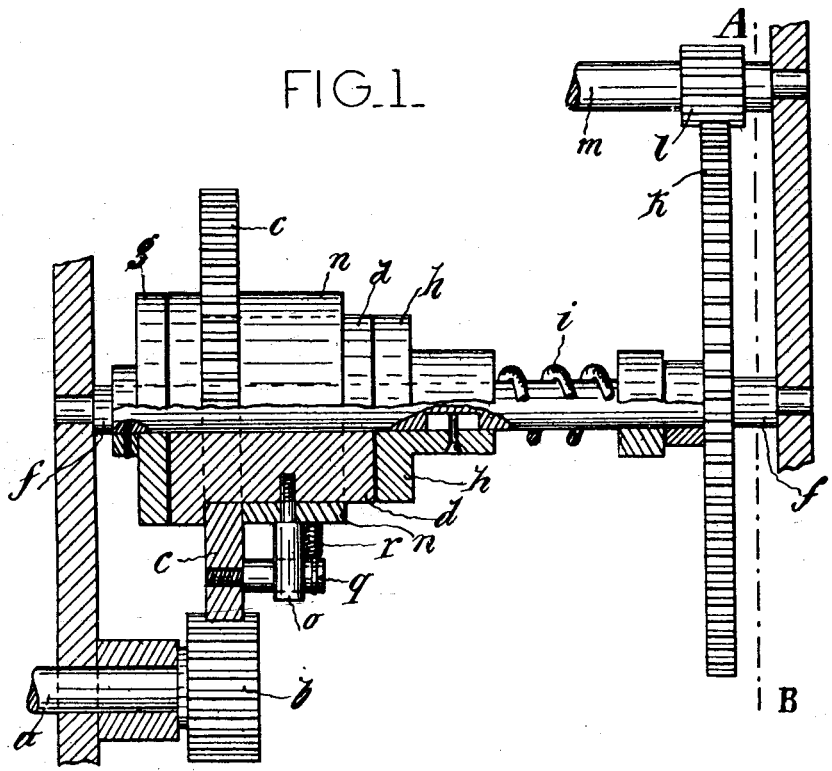
Figure 2:
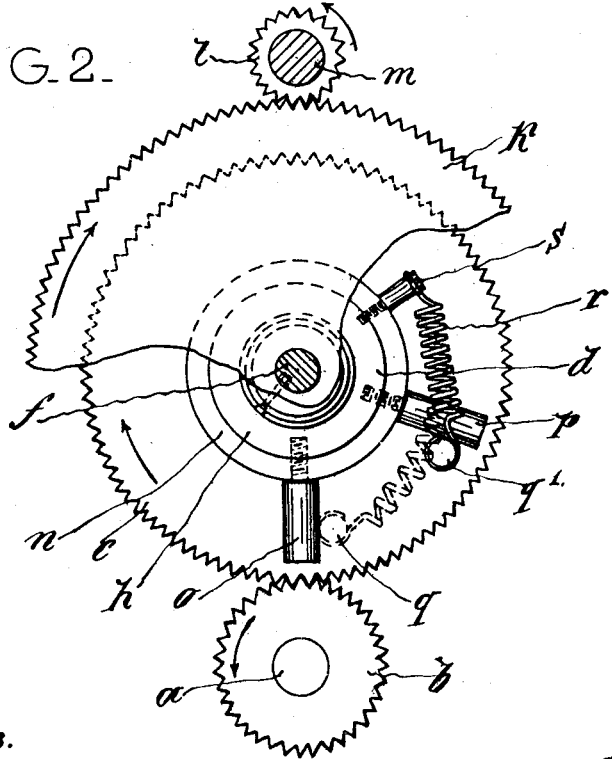

One form of construction of our invention is illustrated in the accompanying drawings. Figure 1 is a side elevation and part section of the device. Fig. 2 is a cross section on the line A—B of Fig. 1, a portion being broken away to display otherwise concealed parts. Fig. 3 is a sectional view showing the train whose main arbor is depicted in the preceding figures. Fig. 4 is a cross section on the line C—D of Fig. 3. Fig. 5 is a sectional view showing the escape-wheel of the train depicted in Figs. 3 and 4, in conjunction with a part of a speed-indicator.

The rotations of the shaft, axle, or other body whose speed is to be indicated, are transmitted by means of a shaft $a$ and pinion $b$ mounted fast thereon to a gear wheel $c$. This wheel $c$ is loosely mounted upon a hub $d$ which sits loosely on the shaft $f$.

$n$ is a collar holding the wheel $c$ in place. The faces of the hub $d$ constitute friction surfaces, with one of which there engages the disk $g$ rigidly mounted on the shaft $f$, while against the other there bears the disk $h$, which is mounted with capability of sliding axially on the shaft $f$. The disk $h$ is forced constantly against the adjacent face of the hub $d$ by means of a spring $i$ coiled around the shaft $f$ and pressing with its other end against the boss of a gear $k$. This latter wheel is mounted fast on the shaft $f$ and transmits the rotary motion of the same to the driving arbor $m$ of a mainspringless clockwork (that is to say, a train of wheels, with regulator, but without any mainspring, such for instance as is shown in Figs. 3 and 4) by meshing with a pinion $l$ mounted fast on the arbor.

$o$, $p$ are two stops projecting radially from the hub $d$, and $q^1$ is a stud protruding from the side of the gear $c$ between the two stops $o$, $p$. The stud $q^1$ is connected by a spring $r$ with a pin $s$ on the hub $d$. When the wheel $c$ rotates, the stud $q^1$ bears against the stop $o$, as indicated by the dotted lines $q$ (Fig. 2). The arbor $m$ (Figs. 1 and 2) by its rotation drives the clockwork-train shown in Figs. 3 and 4, causing the toothed wheel E and pinion F to rotate the escape-wheel G, which is engaged by the pallets of the anchor H, which coöperates with the anchor-fork I engaging the impulse-disk K of the balance L having a spiral spring M, all in well-known manner.

In Fig. 5, T is a cam mounted on the same arbor as the escape-wheel G (Figs. 3 and 4). $R^1$, $R^2$, $R^3$ are spring-actuated levers engaging periodically with the ratchet-wheels X, Y, Z, influencing the speed-indicator in familiar manner. (See U. S. Patent No. 928635, granted to us on July 20, 1909).

The operation of the apparatus is as follows: When the car axle (or other body whose speed is to be indicated) rotates, the shaft $a$ and pinion $b$ will cause the gear $c$ to turn in the direction of the arrow (Fig. 2). The stud $q^1$ on the side of the gear $c$ will thus strike the stop $o$ projecting from the hub $d$, so that the latter will be rotated also. Since the disks $g$, $h$ bear firmly against the ends of the hub $d$ the shaft $f$ will be rotated and its motion will be transmitted by the gear $k$ and pinion $l$ to the arbor $m$, so that the mainspringless clockwork is thus driven direct. Too sudden collision between the stud $q^1$ and stop $o$ on starting the car (or the like) is prevented by the spring $r$.

Having thus described our invention, what we claim as new and desire to secure by Letters Patent of the United States is—

1. A timing mechanism including a source of power, a friction clutch, a regulator, and connecting gearing, one side of the clutch being driven by the source of power, and the other side being rigidly connected to the regulator.

2. A timing mechanism including a source of power; a friction clutch having a shaft, one side of the clutch being rigidly mounted on the shaft, while the other side is loosely mounted thereon, and presents two stops, and carries a loose gear wheel having a stud located between the two stops; a gear meshing with the said gear wheel for transmitting motion thereto from the source of power; a regulator; and gearing rigidly connecting the first said clutch-side to the regulator.

3. A timing mechanism including a source of power; a friction clutch having a shaft, one side of the clutch being rigidly mounted on the shaft, while the other side is loosely mounted thereon, and presents two stops, and carries a loose gear wheel having a stud located between the two stops, and is provided with a spring connecting it to the said stud; a gear meshing with the said gear wheel for transmitting motion thereto from the source of power; a regulator; and gearing rigidly connecting the first said clutch-side to the regulator.

In testimony whereof we affix our signatures in presence of two witnesses.

HANS DAHL.
MAX MARTIN.

Witnesses:
 HENRY HASPER,
 WOLDEMAR HAUPT.